United States Patent [19]

Murakami

[11] 4,006,652
[45] Feb. 8, 1977

[54] FLUID PRESSURE CONTROL SYSTEM FOR MOTOR VEHICLE TRANSMISSIONS

[75] Inventor: Noboru Murakami, Nagoya, Japan

[73] Assignee: Aisin Seiki Kabushiki Kaisha, Japan

[22] Filed: Sept. 20, 1974

[21] Appl. No.: 507,800

[30] Foreign Application Priority Data

Sept. 25, 1973 Japan .............. 48-107833
Sept. 29, 1973 Japan .............. 48-109941

[52] U.S. Cl. .................................. 74/869
[51] Int. Cl.² ......................... B60K 41/18
[58] Field of Search ......... 74/867, 868, 869, 752 C

[56] References Cited

UNITED STATES PATENTS

| | | | |
|---|---|---|---|
| 3,561,294 | 2/1971 | Iijima | 74/869 |
| 3,561,295 | 2/1971 | Iijima | 74/869 |
| 3,563,115 | 2/1971 | Iijima et al. | 74/869 |
| 3,643,527 | 2/1972 | Ohnuma | 74/868 |
| 3,683,721 | 8/1972 | Uozumi et al. | 74/868 X |
| 3,688,608 | 9/1972 | Leach | 74/869 |
| 3,707,891 | 1/1973 | Asano et al. | 74/869 |
| 3,752,015 | 8/1973 | Murakami | 74/869 |
| 3,831,465 | 8/1974 | Murakami | 74/869 |
| 3,871,250 | 3/1975 | Miyauchi et al. | 74/869 |

*Primary Examiner*—Samuel Scott
*Assistant Examiner*—Lance W. Chandler
*Attorney, Agent, or Firm*—Oblon, Fisher, Spivak, McClelland & Maier

[57] ABSTRACT

A fluid pressure control system for a motor vehicle transmission includes a modulator valve interposed between a manual shift valve and frictional engaging devices, such as for example, brakes and clutches, and which is adapted to be actuated so as to drain the supplied line pressure whereby the hydraulic pressure for actuating the frictional engaging devices is gradually increased below a predetermined value and then regulated to a substantially constant value above the predetermined value.

8 Claims, 7 Drawing Figures

FLUID PRESSURE CONTROL SYSTEM FOR MOTOR VEHICLE TRANSMISSIONS

BACKGROUND OF THE INVENTION

1. Field of the Invention

The present invention relates generally to a transmission control system for motor vehicles, and more particularly to a fluid pressure control system for motor vehicle transmissions.

2. Description of the Prior Art

Generally, in order to accomplish operation of the power train for motor vehicle transmissions, it is preferable that the hydraulic pressure for actuating the frictional engaging means be correspondingly adapted to the driving speed of the vehicle, that is, the hydraulic pressure be sufficiently high so as to transmit a substantial amount of torque when the vehicle is driven at low speed and be substantially low so as to transmit a small amount of torque when the vehicle is driven at a high rate of speed. Additionally, it is desirable that the hydraulic pressure applied to the frictional engaging means be gradually increased in order to decrease or avoid any shocks resulting from the transmission gear shifts when the driving ratio is changed from low speed to high speed or vice versa.

In order to satisfy the above-noted requirements, a conventional transmission control system has heretofore involved the use of two independent governor pressures, one of which, having a greater pressure or value, being applied to the regulator valve when the vehicle is driven within a low drive ratio mode, while the other governor pressure, having a smaller pressure or value, is applied to the regulator valve when the vehicle is driven within a high drive ratio mode. Such a system however, is nevertheless not totally satisfactory due to the fact that the presence of a plurality of governor pressures results in a substantial increase in the complexity of the control structure or the machining configurations required of the regulator valve and conduits through which the governor pressures are transmitted. More particularly, the regulator valve is required to utilize a spool piston having a substantial number of lands and must also be made with a high degree of accuracy.

SUMMARY OF THE INVENTION

Accordingly, it is an object of the present invention to provide an improved fluid pressure control system for motor vehicle transmissions which may overcome the difficulties experienced with conventional systems as noted hereinabove.

Another object of the present invention is to provide an improved fluid pressure control system for motor vehicle transmissions wherein the hydraulic pressure for actuating the frictional engaging means is gradually increased when the pressure is below a predetermined value and is then regulated to a substantially constant value when the pressure is above the predetermined value.

Still another object of the present invention is to provide an improved fluid pressure control system for motor vehicle transmissions wherein the hydraulic pressure for actuating the frictional engaging means may be varied in accordance with changes in the drive ratio.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views and wherein.

DETAILED DESCRIPTION OF THE PREFERRED EMBODIMENTS

Figure 1:
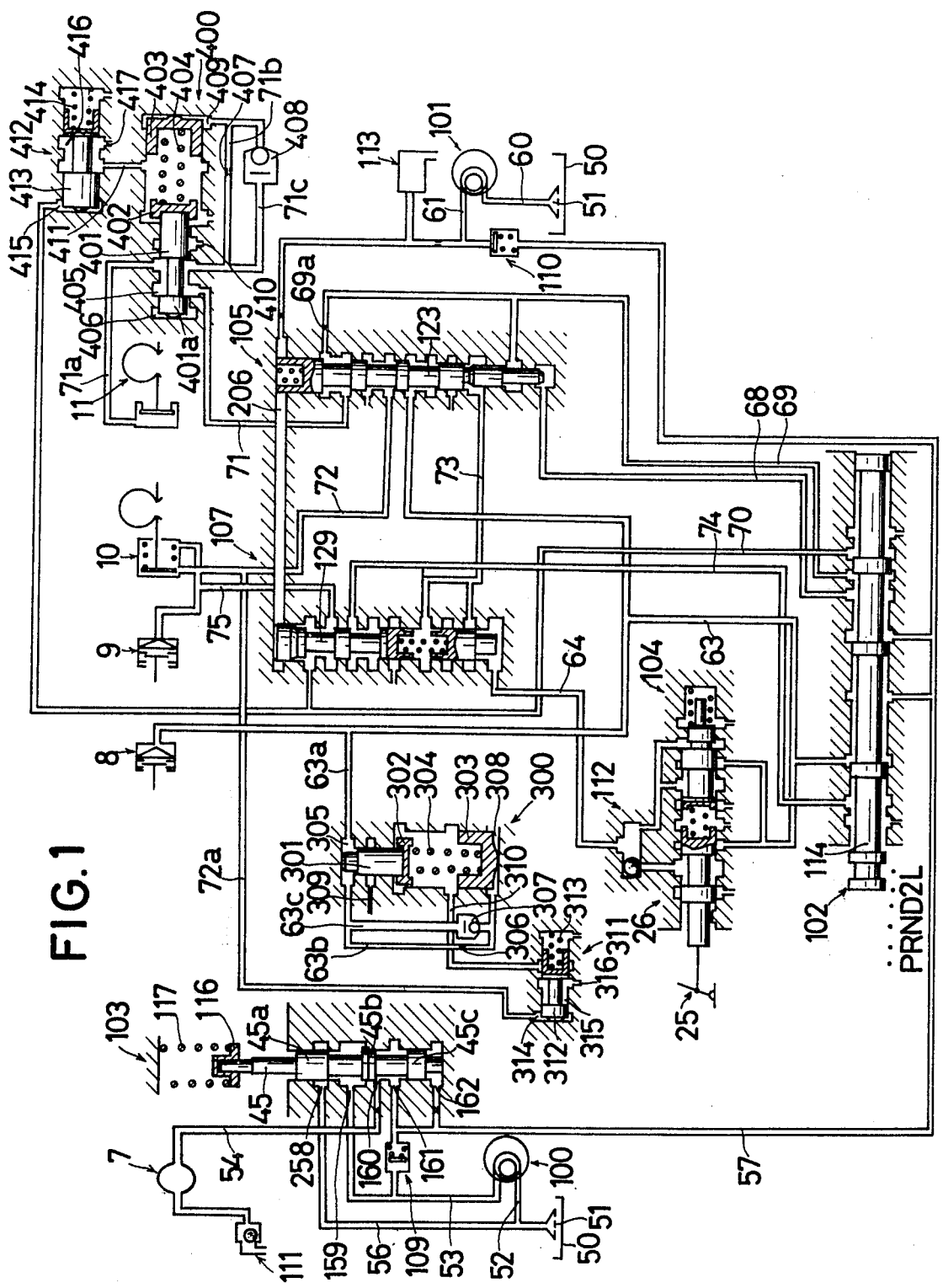
FIG. 1 is a schematic view, with parts shown in cross-section of a fluid control system constructed in accordance with the present invention, and showing its cooperative parts.

Referring now to the drawings and more particularly to FIG. 1 thereof, the hydraulic pressure control circuit of the present invention briefly includes a forward pump 100, a rearward pump 101, a manual shift valve generally indicated by the reference character 102, a regulator valve generally indicated by the reference character 103, a throttle valve 104, a 1-2 shift valve 105, a 2-3 shift valve 107, two check valves 109 and 110, a governor valve 113, and two modulators generally indicated by the reference characters 300 and 400.

The pump 100 driven by means of an engine, not shown, draws fluid from a reservoir 50, through means of a filter 51 and a conduit 52, and supplies the fluid under pressure to a conduit 53. The rearward pump 101 driven by means of an output shaft of the motor vehicle transmission, not shown, also draws fluid from reservoir 50, through means of filter 51 and a conduit 60, and supplies the fluid under pressure conduit 61. A conduit 57 is provided for admitting the line pressure regulated by means of the regulator valve 103 to frictional means 8-11 so as to thereby permit engagement of the same, and check valve 110 is interposed between conduit 61 and the pressure conduit 57 so as to thereby block the fluid flow from conduit 57 to conduit 61 and rearward pump 101. Similarly, the check valve 109, having a construction similar to that of check valve 110, prevents fluid flow to the forward pump 100 from rearward pump 101.

The regulator valve 103 includes a spool 45 having lands 45a, 45b and 45c of the same diameter, a spring 117 serving to bias the spool 45 in the downward direction, a spring retainer 116, and ports 258, 159, 160, 161 and 162. Ports 161 and 162 are connected to the line pressure conduit 57, while port 159 is connected to the conduit 53 associated with forward pump 100 and port 258 is connected to conduit 56 which fluidically communicates with the inlet conduit 52 of pump 100. It is to be noted that the hydraulic pressure supplied to the torque convertor 7 may be predetermined as a result of the selection of the size of conduit 54.

The conventional throttle valve 104 is provided so as to generate hydraulic pressure which corresponds to the degree of depression of accelerator 25 whereby the position at which the transmission is shifted or the hydraulic pressure supplied to the frictional means 8-11 is changed.

The manual shift valve 102, which is to be supplied with the line pressure of conduit 57 is in turn fluidically connected to conduits 63, 68, 69, 70 and 74. Conduit 63 supplies the line pressure to the throttle valve 104, the first clutch 8, and the 1-2 shift valve 105 while conduits 68 and 69 also supply the line pressure to the 1-2 shift valve 105 thereby urging a spool 123 of valve 105 to move in an upward direction. The conduits 70 and 74 are fluidically connected to the 2-3 shift valve 107.

When the spool 123 of the 1-2 shift valve 105 is disposed at its low speed position, that is, the upward position as seen in FIG. 1, a conduit 71 is fluidically connected to conduit 69 and to the reservoir 50. When the spool 123 is disposed at its high speed position, that is, the downward position as seen in FIG. 1, a conduit 72 is fluidically connected to conduit 63 while conduit 71 is fluidically disconnected from conduit 69, conduit 72 being in turn connected to the servo chamber of the first brake 10.

The governor pressure of governor valve 113 is supplied to the 1-2 shift valve 105 through means of a conduit 206 thereby urging spool 123 to move in a downward direction, and the throttle-modulator pressure from the 2-3 shift valve 107 is also supplied to the 1-2 shift valve 105 through means of conduit 73. A spool 129 of 2-3 shift valve 107 is adapted to move upwardly due to the throttle pressure of throttle valve 104 supplied thereto by means of a conduit 64 and is adapted to move downwardly due to the governor pressure of governor valve 113 supplied thereto by means of conduit 206. When the spool 129 is moved downwardly to its high speed position, conduit 74 is fluidically connected to a conduit 75 which is in turn connected to the supply chamber of the second clutch 9 and the release chamber of the first brake 10.

The first modulator 300 includes an upper valve piston 30 supported upon a spring retainer 302, a U-shaped lower piston 303, and a spring 304 interposed between the retainer 302 and the lower piston 303. An upper chamber 305 of modulator 300 is connected to a branch conduit 63a of conduit 63 as well as to a lower chamber 308 through means of a conduit 63b having an orifice 306 disposed therein and a conduit 63c similarly provided with a one-way valve 307. When the valve piston 301 is moved downwardly more than a predetermined distance against the biasing force of spring 304, the upper chamber 305 is fluidically connected to a drain port 309 while when the lower piston 303 is moved upwardly more than a predetermined distance against the biasing force of spring 304, the lower chamber 308 is fluidically connected to an outlet conduit 310.

A change-over valve generally indicated by the reference character 311 is provided within conduit 310 and includes a spool 312, a spring 313 normally urging the spool 312 to move in the leftward direction, and a fluid chamber 314 to which a branch conduit 72a of conduit 72 is connected, the fluid supplied thereto tending to move spool 312 toward the right against the biasing force of spring 313. Although spool 312 interrupts the fluid communication between conduit 310 and an annular chamber 315 of changeover valve 311 when spool 312 is in the illustrated position of FIG. 1, conduit 310 is fluidically connected to chamber 315 and to a drain port 316 when the spool 312 is moved toward the right as seen in the figure due to the hydraulic pressure within chamber 314.

A second modulator 400 similarly includes a spool 401 having a spring retainer 402 secured thereto, a piston 403 disposed opposite spool 401, and a spring 404 interposed between retainer 402 and piston 403. The second modulator 400 further includes an intermediate annular chamber 405, a left end chamber 406 and a right end chamber 409. The annular chamber 405 is fluidically connected to the left chamber 406 through means of an orifice provided within a left portion 401a of spool 401 and is also connected to conduit 71 and to the servo chamber of the second brake 11 through means of a branch conduit 71a as well as to the right chamber 409 through means of a first conduit 71b having an orifice 407 disposed therein and a second conduit 71c disposed parallel to conduit 71b having a one-way valve 408 provided therein. When the hydraulic pressure within chamber 406 becomes greater than the biasing force of spring 404 so as to thereby move the spool 401 toward the right, the left end chamber 406 is fluidically connected to a drain port 410 and when the hydraulic pressure within chamber 409 becomes greater than the biasing force of spring 404 so as to move the piston 403 toward the left, the right chamber 409 is connected to a conduit 411 which is fluidically connected with a second change-over valve generally indicated by the reference character 412.

The second change-over valve 412 comprises a spool piston 413, a spring 414 for normally biasing the spool piston 413 toward the left as seen in the figure, and a chamber 415 which is fluidically connected to conduit 70. It will also be seen that an annular chamber 416 of valve 412 is connected to the conduit 411 as well as to a drain port 417, however, when the hydraulic pressure within chamber 415 is greater than the biasing force of spring 414, the spool piston 413 is moved toward the right thereby blocking conduit 411.

In operation, the spool 114 of the manual shift valve 102 is initially positioned at the L position as seen in FIG. 1, in order to achieve the first or low speed and at this time, the line pressure supplied to the manual shift valve 102 through conduit 57 is transmitted to the conduits 63, 68 and 69. The line pressure within the conduits 68 and 69 serves to fix the spool 123 of the 1-2 shift valve 105 at its low speed position and the hydraulic pressure within conduit 63 causes engagement of the first clutch 8 while the hydraulic pressure within conduit 69 is further transmitted to conduit 71 so as to thereby cause engagement of the second brake 11 through means of the annular chamber 405 of the second modulator 400.

Simultaneously therewith, the hydraulic pressure within conduit 63 is also admitted to the lower chamber 308 of the first modulator 300 through means of conduit 63a, chamber 305 and conduit 63b whereby the lower piston 303 is gradually biased upwardly against the biasing force of spring 304. When the piston is moved upwardly beyond a predetermined distance, chamber 308 is fluidically connected to conduit 310 the flow of which is interrupted or blocked by means of spool piston 312 of change-over valve 311. It should be noted at this time that no hydraulic pressure is admitted to the conduits 72 and 72a since conduit 72 is closed by means of spool 123 of the 1-2 shift valve 105, and therefore, the first modulator 300 does not adjust the hydraulic pressure when the transmission is within the first speed position.

The hydraulic pressure supplied to the annular chamber 405 of the second modulator 400 is of course able to be transmitted to the left chamber 406 thereof through means of the orifice portion 401a as well as to the right chamber 409 thereof through means of conduit 71b and orifice 407, and consequently, the spool 401 is moved toward the right while the piston 403 is moved toward the left. When the piston 403 is moved toward the left beyond a predetermined distance, chamber 409 is fluidically connected to conduit 411 whereby the hydraulic pressure is adjusted to a substantially constant value which is less than the value of the line pressure, and such adjusted pressure controls all of the hydraulic circuitry. It should also be noted that the hydraulic pressure within conduit 411 is not supplied to conduit 70 but is at this time supplied to drain port 417.

When the spool 114 of manual shift valve 102 is shifted to the second speed position 2, the line pressure is not supplied to conduit 69 and consequently, spool 123 of the 1-2 shift valve 105 is moved downwardly when the governor pressure within conduit 206 is increased beyond a predetermined value. Thus, fluid communication between conduits 69 and 71 is interrupted while fluid communication between conduits 63 and 72 is established. In this manner, the first brake 10 is engaged while the second brake 11 is released.

Furthermore, hydraulic pressure is supplied to chamber 314 of changeover valve 311 through means of conduits 72 and 72a and consequently spool 312 is moved toward the right. When spool 312 has moved beyond a predetermined distance, chamber 315 is fluidically connected to conduit 310 which is therefore connected to drain port 316 and in this manner, the hydraulic pressure within conduit 63 is controlled to a substantially constant pressure by means of the first modulator 300. Such adjusted pressure controls all of the hydraulic circuitry and the first clutch 8 and the first brake 10 are engaged in accordance with the second speed drive ratio.

When spool 114 of manual shift valve 102 is shifted to the drive or D position, hydraulic pressure is able to be supplied to the hydraulic circuitry in a manner similar to that accompanying the second speed position, except that hydraulic pressure supplied to conduit 74 but not to conduit 69. Accordingly, the speed change characteristic of the D position is the same as that of the second position.

During driving within the second speed range, when the vehicle speed is increased and the governor pressure within conduit 206 is concomitantly increased, spool 129 of the 2-3 shift valve 107 will be moved downwardly as seen in FIG. 1 and thus, conduit 75 will be connected to conduit 74 so as to thereby engage the second clutch 9 and release the first brake 10, the third speed drive ratio thus being obtained.

When spool 114 of manual shift valve 102 is shifted further to the reverse or R position, the line pressure conduit 57 is fluidically connected to conduits 68, 69, and 70, the line pressure within conduits 68 and 69 serving to fix spool 123 of the 1-2 shift valve 105 at its low speed position whereby the line pressure will be admitted to chamber 405 of the second modulator 400 through means of conduit 71. Such pressure of course acts in substantially the same way as within the first speed position, the line pressure being admitted to conduit 411 when piston 403 is moved toward the left due to the increased line pressure within chamber 409.

Conduit 70 is connected to conduit 75 through means of the 2-3 shift valve 107 whereby the line pressure is also transmitted to the supply chamber of the second clutch 9 and to the release chamber of the first brake 10 as well as to chamber 415 of change-over valve 412. When the hydraulic pressure within chamber 415 overcomes the biasing force of spring 414, spool 413 is moved toward the right so as to thereby close or block conduit 411, and therefore, the second modulator 400 does not control the line pressure, but to the contrary, all of the hydraulic circuitry is controlled by the line pressure regulated by means of the regulator valve 103. Such regulated line pressure facilitates the engagement of the second clutch 9 and the engagement of the second brake 11 so as to thereby obtain rear or reverse drive.

Figure 2:
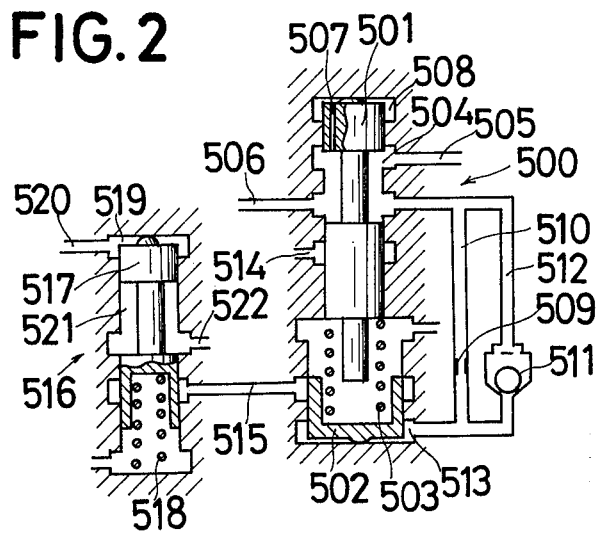
FIG. 2 is a schematic view, partly in cross-section, of another embodiment of the second modulator which may be utilized within the system of FIG. 1.

Referring now to FIG. 2 wherein a second embodiment of the second modulator is illustrated, the illustrated second modulator generally indicated by the reference character 500 comprises a spool 501, a piston 502, and a spring 503 interposed between spool 501 and piston 502. An annular chamber 504 is fluidically communicated with a conduit 505 which is connected to the pressure source, a conduit 506 which is connected to the frictional means, and an upper chamber 508 through means of an orifice 507 provided within spool 501. The chamber 504 is further fluidically connected to a conduit 510 having an orifice 509 disposed therein and a lower chamber 513 through means of another conduit 512 extending parallel to conduit 510 and having a one-way valve 511 provided therein. When the hydraulic pressure within chamber 508 is greater than the biasing force of spring 503 and spool 501 is moved downwardly beyond a predetermined distance, chamber 504 will be connected to a drain port 514. Similarly, when piston 502 is moved upwardly against the biasing force of spring 503, chamber 513 is fluidically connected to a conduit 515 which is in turn connected to a change-over valve generally indicated by the reference character 516.

The change-over valve 516 includes a spool 517 and a spring 518 tending to bias the spool 517 in an upward direction. An upper chamber 519 is connected to a conduit 520 which transmits a pressure decreasing signal, and when the spool 517 is moved downwardly by means of the pressure within chamber 519, the outlet conduit 515 is in communication with an annular chamber 521 and a drain port 522.

When hydraulic pressure is supplied to chamber 504 through means of conduit 505, piston 502 is gradually moved upwardly due to the gradually increasing pressure within chamber 513, until chamber 513 is in communication with conduit 515. When no hydraulic pressure is supplied to chamber 519 through means of conduit 520 and spool 517 closes conduit 515, the modulator 500 does not adjust the hydraulic pressure. When spool 517 is moved downwardly due to the applied pressure within chamber 519, chamber 521 is connected to conduit 515 the hydraulic pressure in which is then drained through port 522. The hydraulic pressure from conduit 505 is thus regulated to a substantially constant value and supplied to the frictional means through means of conduit 506.

Figure 3:
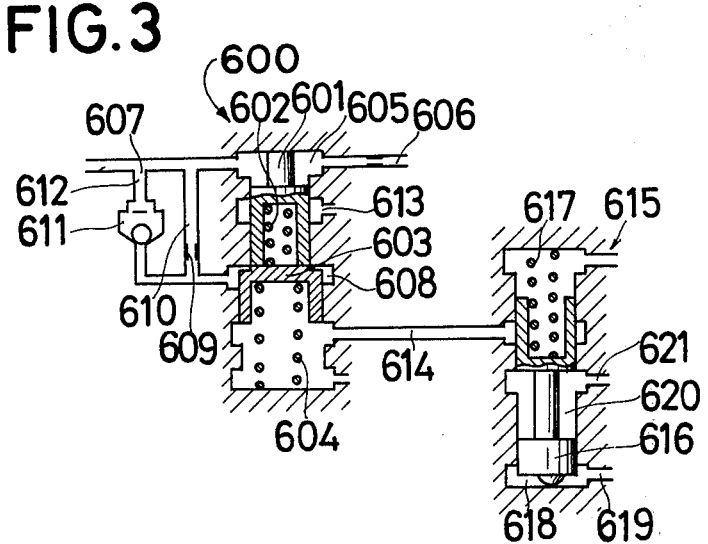
FIG. 3 is a schematic view, partly in section, of another embodiment of the first regulator which may be utilized within the system of FIG. 1.

Referring now to FIG. 3, a second embodiment of the first regulator or modulator is shown, the modulator generally indicated by the reference character 600 including a spool 601, a first spring 602 disposed within a recess of spool 601, a piston 603 disposed below spool 601, and a second spring 604. A chamber 605 is fluidically connected to a conduit 606, which is in turn connected to the fluid pressure source, and to a conduit 607 which is in turn connected to the frictional means. An annular chamber 608 is connected to a conduit 610, having an orifice 609 disposed therein, and to a conduit 612 extending parallel to conduit 610 and having a one-way valve 611 disposed therein. When the spool 601 is moved downwardly against the biasing forces of springs 602 and 604, chamber 605 will be fluidically connected to a drain port 613, and when the hydraulic pressure within annular chamber 608 and the biasing force of spring 602 is greater than the biasing force of spring 604 whereby piston 603 will be moved downwardly beyond a predetermined distance, annular chamber 608 will be fluidically connected to an outlet conduit 614 which has a change-over valve generally indicated by the reference character 615 associated therewith.

Change-over valve 615 comprises a spool 616, a spring 617 disposed thereabove, and a chamber 618 connected to a conduit 691 through which a pressure-decreasing signal is transmitted. When the spool 616 is moved upwardly against the biasing force of spring 617 by means of the hydraulic pressure within chamber 618, an annular chamber 620 will be connected to the outlet conduit 614 the pressure within which will be drained through means of a port 621.

When the hydraulic pressure is introduced to chamber 605 from conduit 606, the hydraulic pressure is then admitted to the frictional means through means of conduit 607 as well as to chamber 608 through means of conduit 610. When the piston 603 is moved downwardly beyond a predetermined distance, annular chamber 608 will be in communication with conduit 614, at which time, when no pressure is supplied to chamber 618, the modulator 600 does not regulate the hydraulic pressure since conduit 614 is closed by means of spool 616. When the spool 616 is moved upwardly by means of the hydraulic pressure within chamber 618, conduit 614 will be connected to chamber 620 as well as to drain port 621, and consequently, the hydraulic pressure is adjusted to substantially constant value and supplied to the frictional means.

Figure 4:
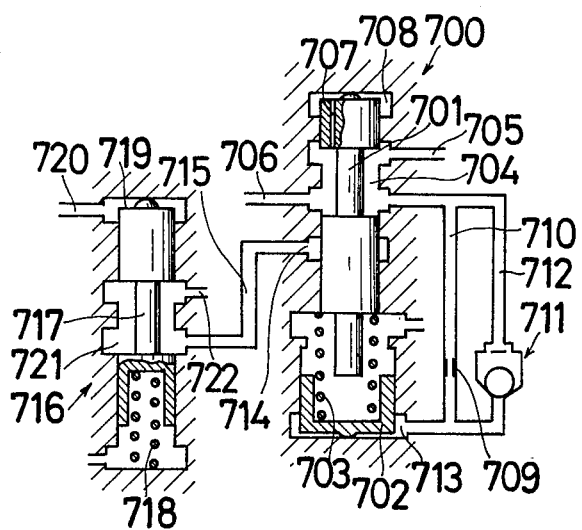
FIG. 4 is a view similar to that of FIG. 2, showing however another embodiment of the second modulator.

Turning now to FIG. 4, a third embodiment of the second modulator is shown, the illustrated modulator generally indicated by the reference character 700 comprising a spool 701, a piston 702 disposed opposite spool 701, and a spring 703 interposed therebetween. An annular chamber 704 is fluidically connected to a conduit 705 which is in turn connected to the fluid pressure source, a conduit 706 which is in turn connected to the frictional means, and a chamber 708 through means of an orifice passageway 707 provided within the upper land portion of spool 701. The annular chamber 704 is also connected to a lower chamber 713 associated within piston 702 through means of a conduit 710 having an orifice 709 disposed therein and another conduit 712 extending parallel to conduit 710 and having a one-way valve 711 disposed therein, and is further communicated with a port 714 when spool 701 is shifted downwardly.

A change-over valve, generally indicated by the reference character 716 is associated with conduit 715 and is seen to comprise a spool 717, a spring 718 disposed within a lower recess of spool 717, and a chamber 719 which is connected to a conduit 720 for transmitting the pressure increasing signal. When the outlet conduit 715 is connected to chamber 721 as illustrated in FIG. 4, the hydraulic pressure is drained through means of drain port 722.

When hydraulic pressure is supplied to chamber 704, the pressure is transmitted to the frictional means through means of conduit 706, to chamber 708 through means of orifice 707, and to chamber 713 though means of conduit 710, the pressure supplied to chamber 713 tending to bias piston 702 upwardly. When no pressure increasing signal is applied to chamber 719 of change-over valve 716, the hydraulic pressure, corresponding to the biasing force of spring 703 compressed by means of piston 702, is transmitted to the frictional means through means of conduit 706 since port 714 is fluidically connected to drain port 722. Within such state, when the pressure increasing signal is transmitted to chamber 719, spool 717 is moved downwardly so as to interrupt the fluid communication between conduit 715 and port 722, and consequently, modulator 700 does not regulate the hydraulic pressure any longer and the line pressure supplied to conduit 705 is directly supplied to the frictional means through means of conduit 706.

Figure 5:
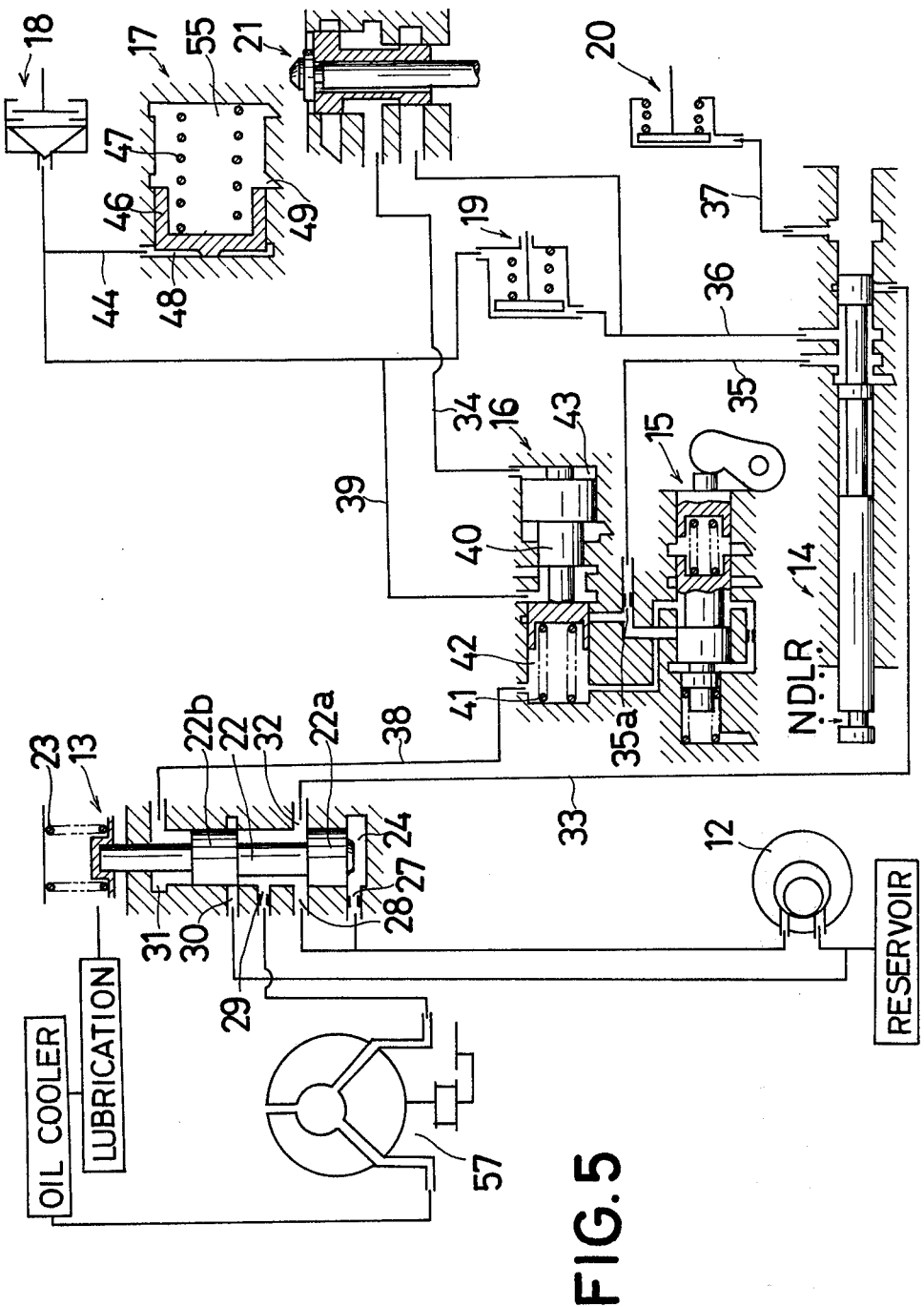
FIGS. 5–7 are views similar to that of FIG. 1, showing however other embodiments of the present invention.

Reference now being made to FIG. 5, another embodiment of the present invention is shown wherein an oil pump 12 is driven by means of an engine, not shown, so as to transmit pressure to the hydraulic circuitry, and a first regulator valve generally indicated by the reference character 13 and comprising a spool 22, an upper spring 23, and lower upper fluid chambers 24 and 31, is connected therewith, spool 22 having lower and upper lands 22a and 22b respectively, of the same diameter. The hydraulic pressure generated by means of the pump 12 is admitted to an inlet port 28 having an orifice 27 disposed therein and an orifice 29 is also provided for controlling the flow of lubricating oil to a torque convertor 57. An outlet port 30 is controlled by means of land 22b of spool 22 which is in turn controlled by the hydraulic pressure within chambers 24 and 31 and the biasing force of spring 23, and thus, a high line pressure is supplied to a conduit 33 through means of an outlet port 32.

A manual shift valve generally indicated by the reference character 14 is supplied with the line pressure through means of the conduit 33 and in turn selectively supplies the line pressure to frictional means such as for example, a clutch 18 and brakes 19 and 20. As seen in FIG. 5, the manual shift valve 14 is located at its N or neutral position wherein all of the frictional means 18-20 are disengaged since conduit 33 is closed by the right end land of valve 14. When the valve 14 is shifted to its D or drive position, conduit 33 is fluidically connected to conduits 35 and 36 and when valve 14 is in its L or low position, conduit 33 is connected only to conduit 36. Similarly, when valve 14 is in its R or reverse position, conduit 33 is connected to a conduit 37 which is in turn connected to the engaging chamber of the second brake 20.

Conduit 35 is fluidically connected to a throttle valve 15 and a shift valve generally indicated by the reference character 16 through means of an orifice 35a. The throttle pressure regulated by means of the throttle valve 15 is supplied to chamber 31 of the first regulator valve 13 through means of a chamber 42 of shift valve 16 and a conduit 38. Within chamber 42, there is disposed a spring 41 for biasing a spool 40 toward the right as seen in the figure, and a right end chamber 43, connected to a governor valve 21 through means of a conduit 34, is provided for countering the biasing force of spring 41 as well as the hydraulic pressure within chamber 42.

When the governor pressure within chamber 43 is low, while the throttle pressure within chamber 42 in addition to the biasing force of spring 41 is high, no hydraulic pressure is supplied to shift valve 16 as seen in the figure. When however the governor pressure within chamber 43 is greater than the throttle pressure and the spring force, conduit 35 is fluidically connected to a conduit 39 which is in turn connected to the engaging chamber of clutch 18 and the releasing chamber of the first brake 19.

An accumulator, generally indicated by the reference character 17, comprises a piston 46, a spring 47 for normally urging piston 46 in the left direction, and a chamber 55 within which spring 47 is disposed. A left end chamber 48 is disposed upon the opposite side of piston 46 as that of chamber 55 and is connected to a branch conduit 44 of conduit 39 which leads to clutch 18.

When the governor pressure from valve 21 and transmitted to shift valve 16 is increased so as to move spool 40 whereby communication between conduit 35 and conduit 39 is established, the hydraulic pressure is supplied to chamber 48 through means of conduit 44 and consequently piston 46 is moved toward the right whereby drain port 49 is connected to conduit 44, the line pressure thus being regulated to a relatively low constant value.

In operation, within the neutral position as shown in FIG. 5, the high line pressure regulated by means of valve 13 is supplied to the manual shift valve 14 which blocks the fluid communication between conduits 33 and 35–37, and consequently, clutch 18 as well as brakes 19 and 20 remain disengaged. When the manual shift valve 14 is shifted to its D or drive position however, the line pressure within conduit 33 is supplied to conduits 35 and 36, the line pressure within conduit 36 being admitted to the engaging chamber of the first brake 19 and the governor valve 21 while the line pressure within conduit 35 is admitted to the shift valve 16 and the throttle valve 15. The operation of shift valve 16 is controlled by means of the throttle pressure within chamber 42 and the governor pressure within chamber 43, and until the governor pressure is sufficiently increased, spool 40 blocks the fluid communication between conduits 35 and 39 so that only the low speed forward drive is established.

When the vehicle speed is increased so as to increase the governor pressure, fluid communication between conduits 35 and 39 is established so as to release the first brake 19. Simultaneously therewith, the hydraulic pressure is also applied to chamber 48 of accumulator 17 whereby piston 46 is moved toward the right and the hydraulic pressure is drained through means of drain port 49, the engagement pressure to be applied to clutch 18 thus being regulated to a relatively low constant value and consequently, high speed forward drive is established.

Figure 6:
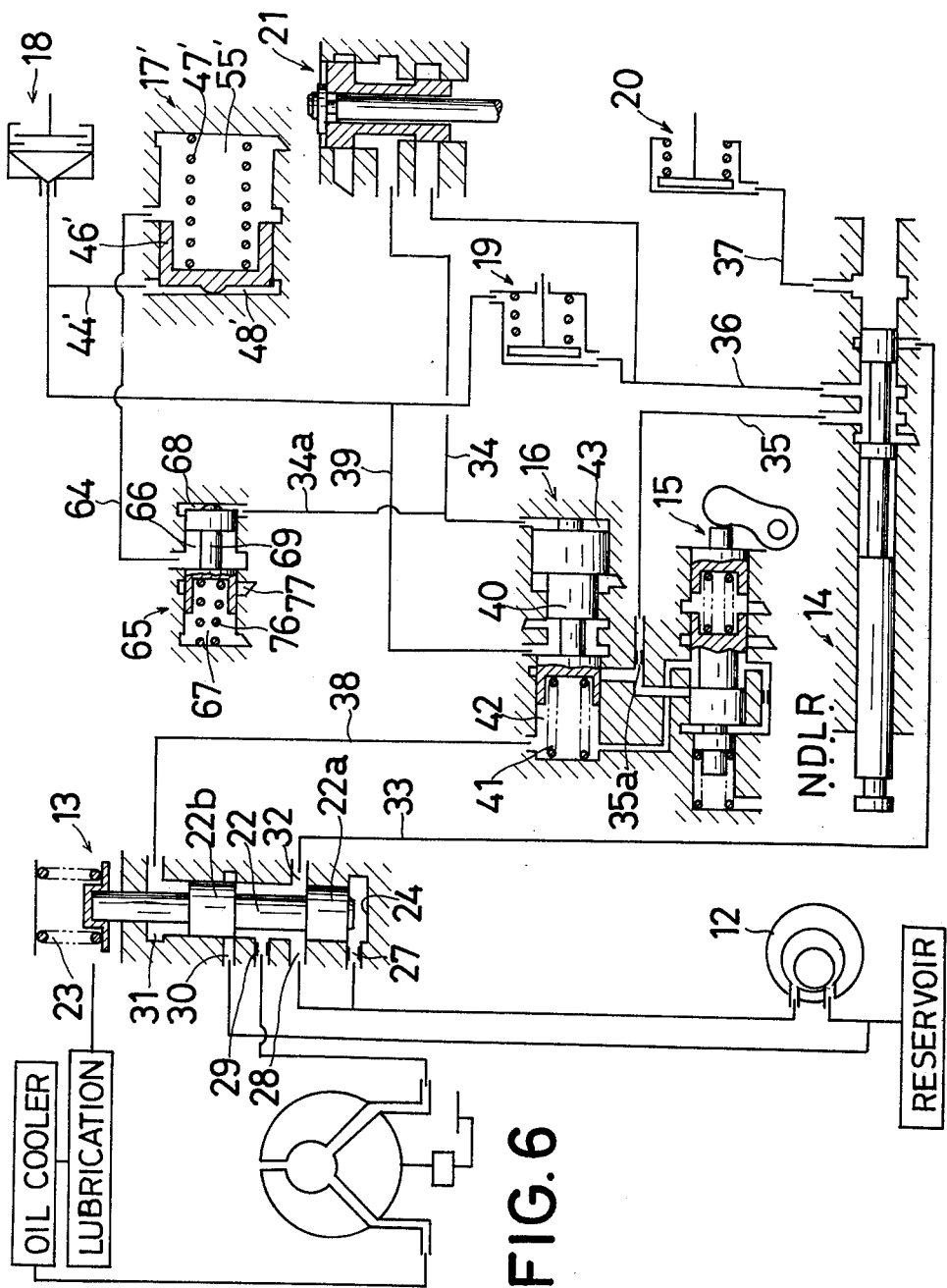

Referring now to FIG. 6 wherein a further modification of the present invention is shown an accumulator generally indicated by the reference character 17′ comprises a piston 46′, a biasing spring 47′, and left and right fluid chambers 48′ and 55′. Chamber 48′ is fluidically connected to a conduit 44′ while chamber 55′ is similarly connected to a conduit 64 which is in turn connected to a second regulator or change-over valve generally indicated by the reference character 65. Change-over valve 65 comprises a spool 69, a biasing spring 76, and a left chamber 67 within which a spring 76 is disposed as well as an annular chamber 66 to which conduit 64 is connected and a right chamber 68 to which a branch conduit 34a of conduit 34 is connected. When chamber 48′ is fluidically connected conduit 64 and spool 69 of change-over valve 65 is moved leftwardly by means of the governor pressure from valve 21 and transmitted through conduits 34 and 34a, the hydraulic pressure will be regulated through means of a drain port 77 of change-over valve 65.

Consequently, when the manual shift valve 14 is moved to its D or drive position and the vehicle speed is increased with a low throttle pressure, spool 40 of throttle valve 16 is moved toward the left by means of the relatively high governor pressure whereby clutch 18 is engaged so as to establish the high speed forward drive. When the vehicle speed is further increased, the governor pressure within chamber 68 of the second regulator valve 65 is increased so as to move the spool 69 toward the left whereby annular chamber 66 will be connected to drain port 77 and consequently the hydraulic pressure transmitted to clutch 18 will be regulated to a relatively low constant value. It should be noted that fluid communication between conduit 64 and chamber 48′ has of course been established at such time.

Figure 7:
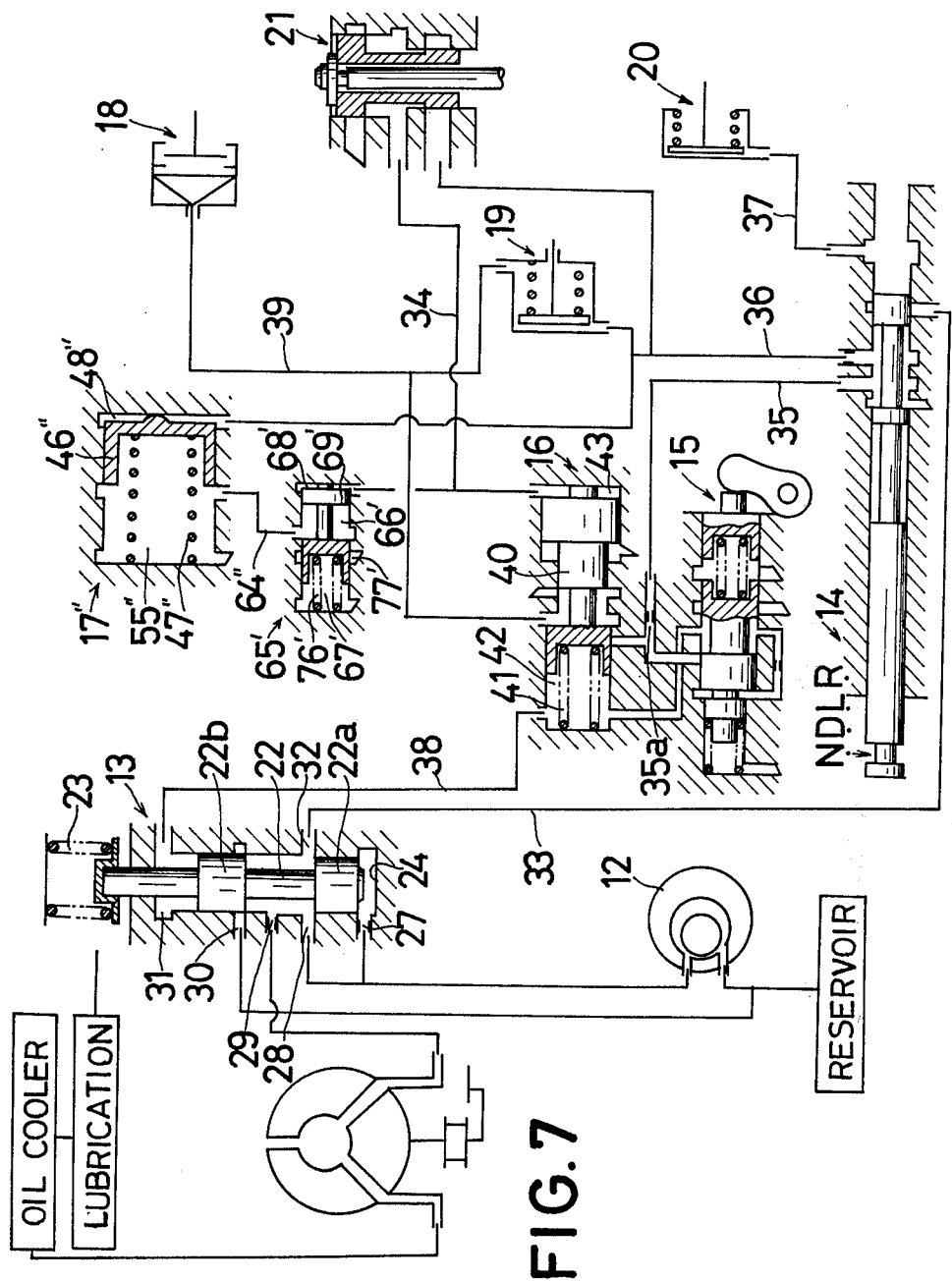

Turning to FIG. 7 wherein still another modification of the present invention is disclosed, an accumulator generally indicated by the reference character 17″ is seen to comprise a piston 46″, a biasing spring 47″, and right and left end chambers 48″ and 55″. Chamber 48″ is fluidically connected to conduit 36 while chamber 55′ is fluidically connected to a conduit 64″ which is in turn connected to a second regulator or change-over valve generally indicated by the reference character 65′. Change-over valve 65′ similarly comprises a spool 69′, a biasing spring 76′, and a left end chamber 67′ as well as an annular chamber 66′ which is connected to conduit 64″ and a right end chamber 68′ which is connected to conduit 34. A drain port 77′ is disposed so as to communicate with chamber 66′ when spool 69′ is moved toward the left.

When the manual shift valve 14 is shifted to its D or drive position, the line pressure within conduit 33 is supplied to conduits 35 and 36, the high line pressure within conduit 36, causing engagement of the clutch 18, is also admitted to chamber 48″ of accumulator 17″ whereby piston 46″ is gradually moved leftwardly until chamber 48″ is in communication with conduit 64″ and chamber 66′ of the second regulator valve 65′. When the vehicle speed is further increased, the governor pressure within the right chamber 68′ of valve 65′ is increased so as to move the piston 69′ in the left direction and therefore, the hydraulic pressure will be drained through means of drain port 77′ whereby fluid pressure supplied to brake 19 will be regulated to a relatively low constant value.

Obviously, many modifications and variations of the present invention are possible in light of the above teachings. It is to be understood therefore that within the scope of the appended claims the present invention may be practiced otherwise than as specifically described herein.

What is claimed as new and desired to be secured by Letters Patent of the United States is:

1. A fluid pressure control system for a motor vehicle transmission, comprising:
    a hydraulic fluid pressure source;
    fluid pressure regulator means for regulating the pressure of said hydraulic fluid from said fluid pressure source to a particular line pressure value;
    a plurality of frictional engaging means actuated by said line pressure from said fluid pressure regulator means for attaining a particular gear ratio within the gear trains of said transmission;
    shift valve means operatively connected to said fluid pressure regulator means for selectively supplying said line pressure to either of said plurality of frictional engaging means;
    a first conduit fluidically connecting said shift valve to said frictional engaging means; and
    modulator means, disposed within said conduit and including a first piston, a first biasing spring, and a drain port through which said hydraulic pressure within said conduit is drained due to movement of said piston against the biasing force of said spring, for initially, constantly, gradually increasing said hydraulic pressure supplied to said frictional engaging means and subsequently regulating said hydraulic pressure supplied to said frictional engaging means to a substantially constant value for engaging said frictional engaging means.

2. A fluid pressure control system as set forth in claim 1, wherein said modulator means comprises:
    a change-over valve,
    said change-over valve including a spool-piston and a second biasing spring,
    the movement of said spool-piston controlling the opening and closing of said drain port in cooperation with said movement of said first piston.

3. A fluid pressure control system as set forth in claim 2, further comprising:
    a governor valve for generating a governor pressure which is increased and decreased in response to the speed of said vehicle; and
    a conduit fluidically connecting said change-over valve to said governor valve,
    whereby said drain port is closed while said governor pressure admitted to said change-over valve through means of said second conduit is below a predetermined value and is opened so as to drain said line pressure when said governor pressure is above said predetermined value.

4. A fluid pressure control system as set forth in claim 2, further comprising:
    a third conduit fluidically connecting said change-over valve to said manual shift valve,
    whereby said spool-piston of said change-over valve is moved so as to control the opening and closing operation of said drain port when said line pressure is applied to said change-over valve through said third conduit.

5. A fluid pressure control system as set forth in claim 4, wherein said spool-piston of said change-over valve normally opens said drain port, and is adapted to close said drain port when said line pressure is applied to said change-over valve through said third conduit.

6. A fluid pressure control system as set forth in claim 4, wherein said spool-piston of said change-over valve normally closes said drain port and is adapted to be moved so as to open said drain port when said line pressure is applied to said change-over valve.

7. A fluid pressure control system as set forth in claim 4, wherein said modulator means further comprises:
    a second piston opposed to said first piston with respect to said first spring; and
    wherein said line pressure within said first conduit is admitted to said first piston through orifice means and a one-way valve.

8. A fluid pressure control system as set forth in claim 7, wherein said second piston is provided with an orifice through which said line pressure is adapted to be transmitted so as to move second piston in a direction opposite to that to said first piston.

* * * * *